Nov. 10, 1953  R. J. WISE ET AL  2,658,940
OPTICAL SCANNING DEVICE
Original Filed Oct. 26, 1945  6 Sheets-Sheet 1

INVENTORS
R. J. WISE
G. H. RIDINGS
BY
*A. A. Thomas*
ATTORNEY

Nov. 10, 1953

R. J. WISE ET AL 2,658,940

OPTICAL SCANNING DEVICE

Original Filed Oct. 26, 1945

INVENTORS
R. J. WISE
G. H. RIDINGS

BY

*A. A. Thomas*

ATTORNEY

Nov. 10, 1953

R. J. WISE ET AL 2,658,940

OPTICAL SCANNING DEVICE

Original Filed Oct. 26, 1945

*INVENTORS*
R. J. WISE
G. H. RIDINGS

BY

*A. A. Thomas*

ATTORNEY

Nov. 10, 1953 R. J. WISE ET AL 2,658,940
OPTICAL SCANNING DEVICE
Original Filed Oct. 26, 1945 6 Sheets-Sheet 5

INVENTORS
R. J. WISE
G. H. RIDINGS
BY
ATTORNEY

Nov. 10, 1953 R. J. WISE ET AL 2,658,940
OPTICAL SCANNING DEVICE
Original Filed Oct. 26, 1945 6 Sheets-Sheet 6

*INVENTORS*
R. J. WISE
G. H. RIDINGS
BY *A. A. Thomas*
ATTORNEY

Patented Nov. 10, 1953

2,658,940

UNITED STATES PATENT OFFICE 2,658,940

OPTICAL SCANNING DEVICE

Raleigh J. Wise, Arlington, and Garvice H. Ridings, Summit, N. J., assignors to The Western Union Telegraph Company, New York, N. Y., a corporation of New York Original application October 26, 1945, Serial No. 624,786. Divided and this application January 26, 1951, Serial No. 208,035

11 Claims. (Cl. 178—17)

This invention relates to facsimile transmitters of the optical scanning type, and its general object is to provide optical scanning mechanism particularly adapted for coded tape transmission.

This optical scanning mechanism comprises a novel structure for projecting a sharply focused image of the scanned area of the tape onto an apertured plate so designed as to produce a signal wave with an approximately straight front. The apertured plate is completely shielded between a pair of transparent members, so that no dust particles can gather in the minute aperture of the plate to interfere with the passage of light reflected from the scanned tape to the photocell of the apparatus. A manually adjustable mounting for the apertured plate affords a quick and easy focusing of the illuminated tape area on the plate and this image is always viewable through a sight opening in the scanning box.

Another important feature of our optical scanning apparatus comprises means for automatically sending a standby signal to the line when the tape runs out. This standby signaling means responds automatically to the absence of tape at the point where the exciter lamp projects its scanning beam. The special signals generated under those conditions inform the attendant at a distant receiver that the transmitter has temporarily run out of tape and that he should stand by for the next message.

A practical embodiment of our invention is illustrated in the accompanying drawings, in which—

The parts that comprise the scanning mechanism, usually called the scanning head, are mounted on a base plate 100 which is supported on a pair of uprights 102. A light-proof cover 104, removably mounted on base 100, encloses the entire mechanism which is properly positioned in the machine as a unitary structure.

Figure 7:
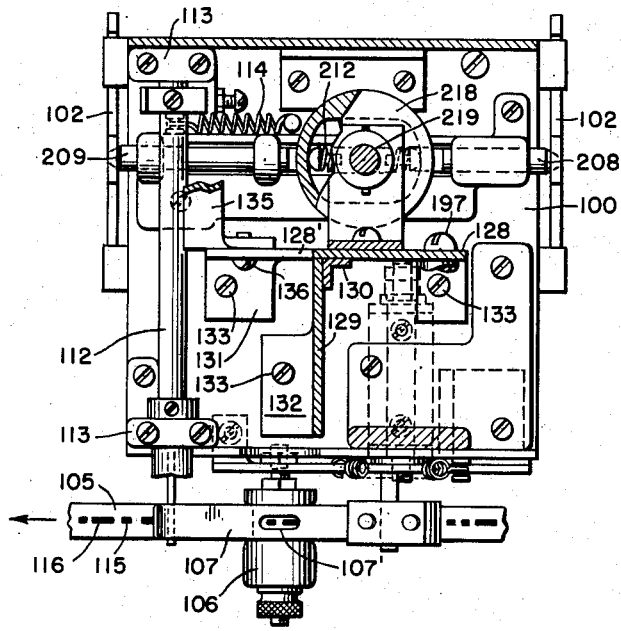
Fig. 7 is a sectional plan view approximately on the broken line 7—7 of Fig. 1.

The machine is designed to operate on a tape 105 supported in the optical scanning field in any practical way, as by a spool or guide roller 106 and a spring blade 107, between which the tape is held as it is pulled along at the proper speed by a motor driven pulley 108. The spring blade 107 has a slot 107' (Fig. 7) for the passage of the light to the marks on the tape. A pressure roller 109 mounted on a rock arm 110 cooperates with the pulley 108 to form tape driving means for the scanning mechanism. The arm 110 is fixed on a shaft 112 mounted in brackets 113 on the base plate 100 (Fig. 7), and a spring 114 always tends to rock the arm down so as to hold the roller 109 pressed against the tape on pulley 108. The code marks on the tape, as herein shown by way of example, consist of square dots 115 and rectangular dots 116 properly spaced and grouped to represent secret intelligence.

The tape driving mechanism thus briefly described is part of the subject matter of the pending application of Wise et al., Serial No. 624,786, filed October 26, 1945, now U. S. Patent 2,592,779, of which the present case is a division as required by the Patent Office. As far as the optical scanning mechanism of the present invention is concerned, any suitable tape driving means may be employed.

Figure 3:
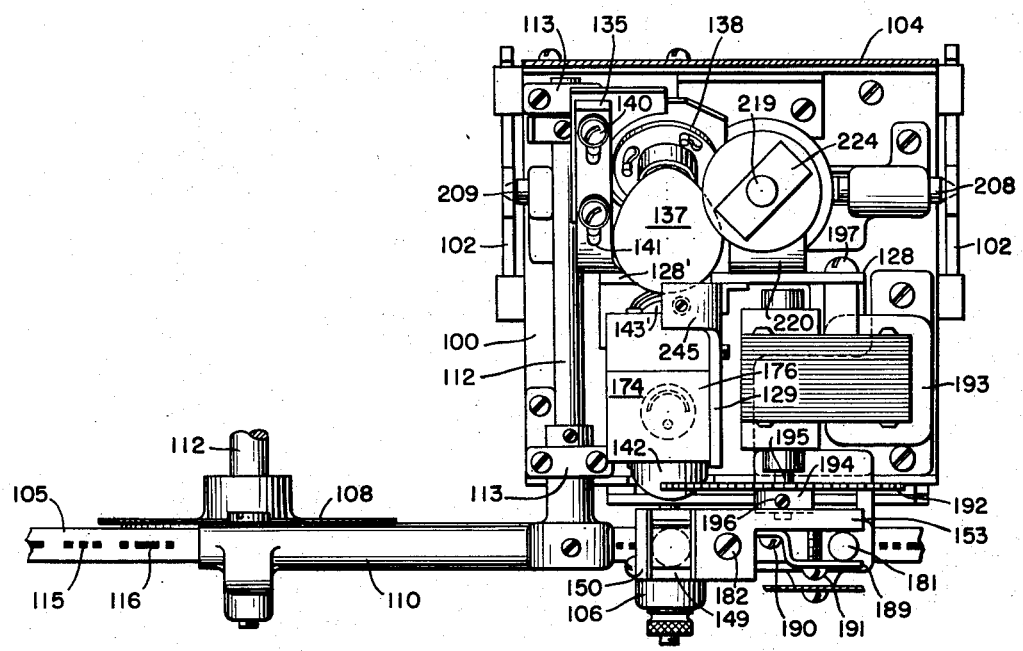
Fig. 3 is a top view of Fig. 1.
Figure 3A:
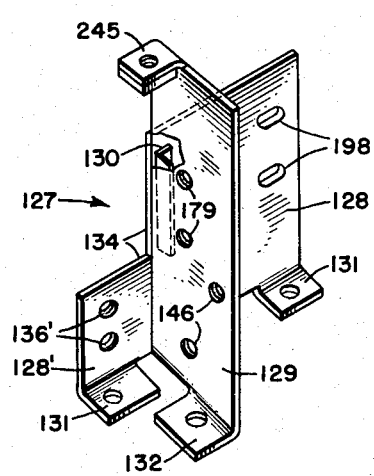
Fig. 3A shows a detached perspective of a bracket in the scanning head.

On the base plate 100 of the scanning head is mounted an upright bracket constructed as shown in Fig. 3A and indicated as a whole by 127. This bracket consists of two sheet metal plates 128 and 129 arranged at right angles and secured together in any practical way, as by an angle bar 130 welded or riveted to the plates. The plate 128 has a pair of footpieces 131 and the plate 129 has a footpiece 132. Screws 133 passing through these footpieces (see Fig. 7) secure the bracket as a single piece to the base plate 100. The bracket is so positioned that the plate 128 extends lengthwise of the scanning head and the plate 129 goes from front to rear. The plate 128 is cut away at 134 to provide room for certain optical parts, as will be seen shortly.

Figure 4:
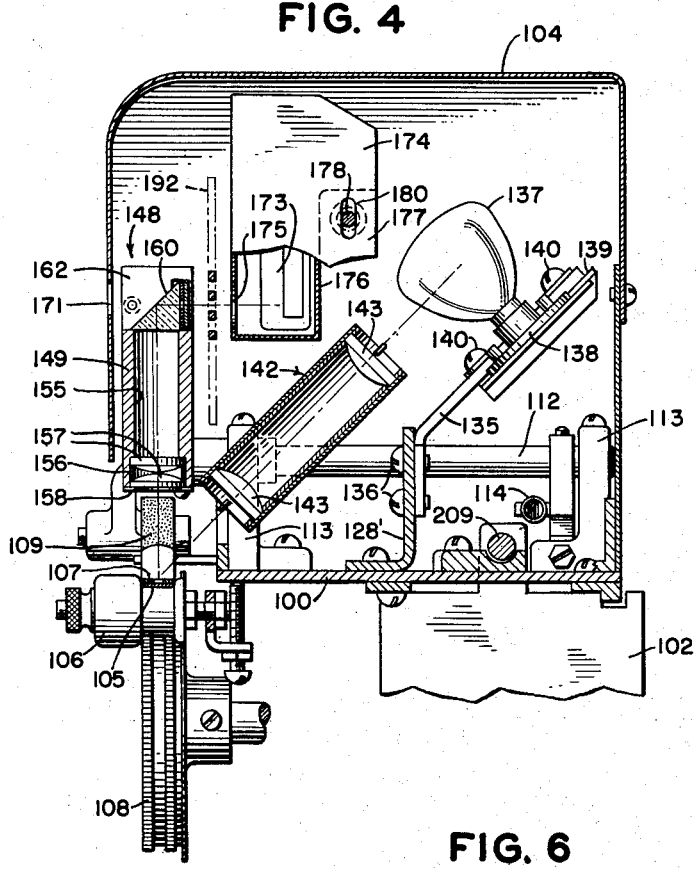
Fig. 4 represents a section on 4—4 of Fig. 1.

Referring to Fig. 4, there is an arm 135 fastened to a rear extension 128' of bracket plate 128 by screws 136 which pass through holes 136' in bracket 127. The arm 135 extends upward and rearward at an angle of 45° and supports an exciter lamp 137, preferably of the prefocused spotlight type. This lamp is mounted in a suitable socket 138 which is attached to a plate 139 carried by the arm 135. The plate 139 is secured to the underside of arm 135 by screws 140 which pass through slots 141 in the arm, as seen in Fig. 3. In this way the lamp 137 is adjustable lengthwise of the arm 135, which may itself be adjustable vertically on bracket 127 by passing the screws 136 through vertical slots either in the bracket or in the arm. The purpose of this double adjustment of the exciter lamp 137 is to focus a spot of scanning light sharply on the tape.

Figure 2:
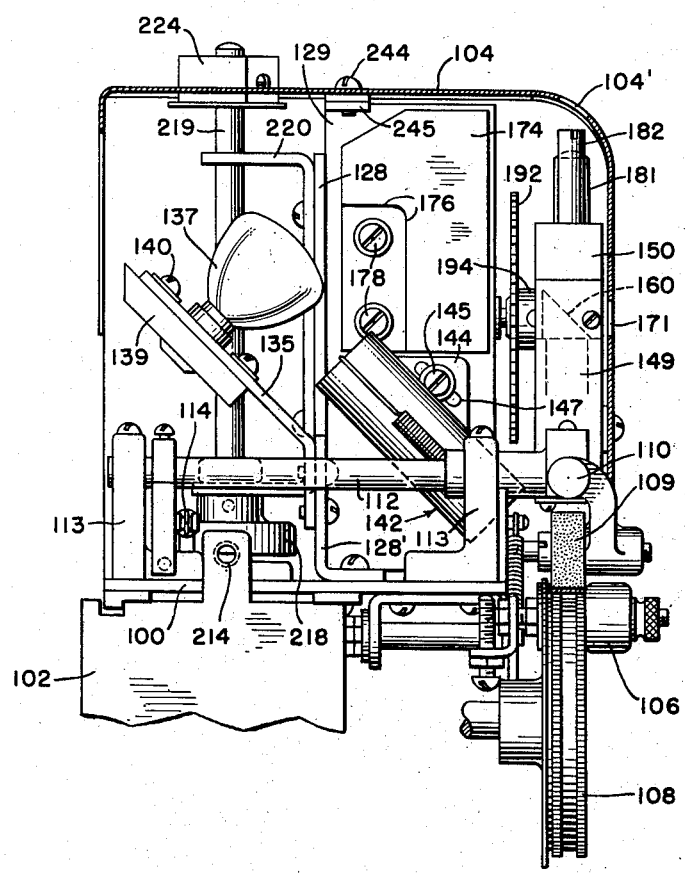
Fig. 2 is a side view of Fig. 1, looking from left to right.

Light from the exciter lamp 137 passes through a projection lens assembly 142, mounted in front of the lamp at an angle of 45°. We shall not go into the structural details of this device for they are old in the art and are well understood. A tube or barrel containing the usual lenses 143 is soldered or otherwise fastened along one side to a plate 144 (see Fig. 2) and this is attached by screws 145 to the plate 129 of bracket 127. Only one screw 145 is shown in Fig. 2, but the position of the other screw will be apparent from Fig. 3A where the holes 146 are for the screws 145. The plate 144 may have screw slots 147 to permit axial adjustment of the lens tube 142 with respect to the lamp 137. The purpose of the optical unit 142 is to project a bright spot of light on the tape as it passes over the spool 106. The illuminated area of the tape is the surface exposed by the slot 107' of spring blade 107, as will be clear from Fig. 7. By making proper adjustments of the exciter lamp 137 and the projection tube 142, a uniform illumination of the tape at the scanning point is obtained.

Figure 1:
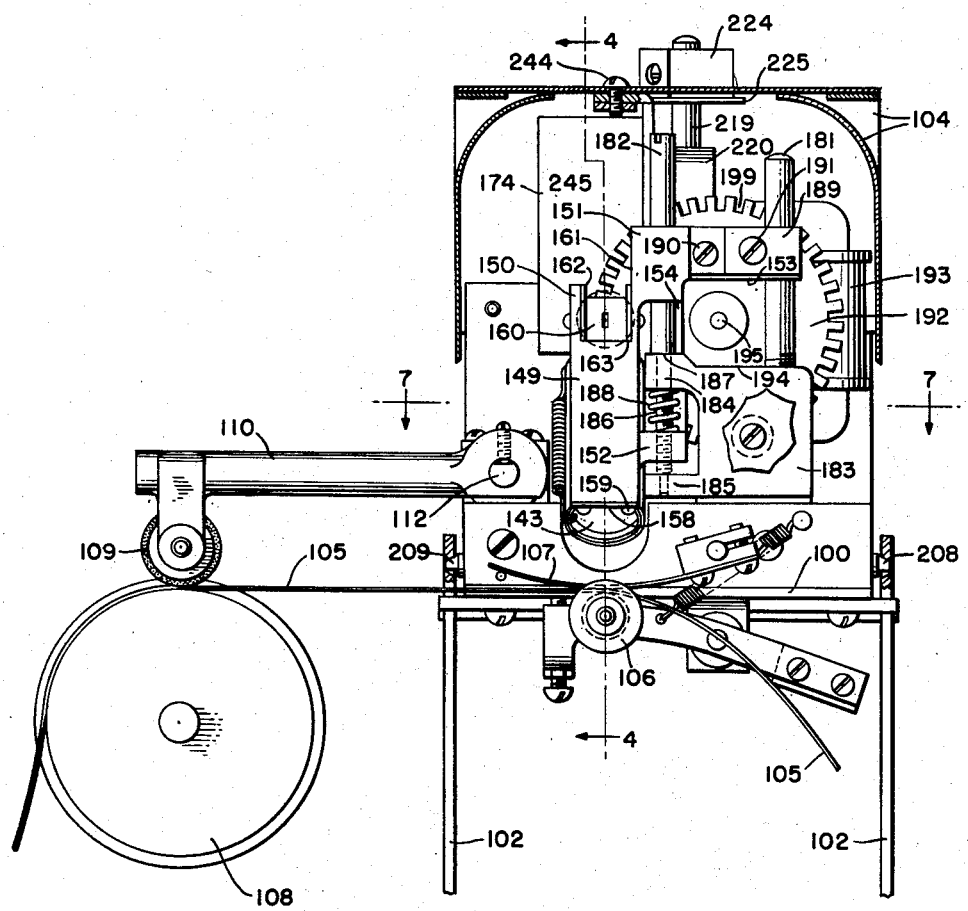
Fig. 1 is a front view of our scanning mechanism.

The light projected by the tube 142 onto the tape is reflected through a pickup lens assembly 148 which is arranged in vertical position directly over the scanned area of the tape. As this device comprises several novel features, we shall describe the construction more fully. As seen in Fig. 1, the outer part of this assembly is a casting of peculiar shape comprising a hollow column or tube 149, an upright extension 150 rising from the top of the column, a pair of thick lateral lugs 151 and 152 arranged in vertical alignment, and a lateral extension 153 on the upper lug 151. The lugs 151 and 152 may be connected at their rear edges by a strengthening rib 154. This unitary structure of parts 149 to 154 is preferably a one-piece casting of bronze or like material.

Referring to Fig. 4, the tube 149 has a cylindrical bore 155 which terminates at the bottom in a chamber 156 for a pair of lenses 157. These are held in place by a ring 158 which is secured to the bottom edge of the tube in any practical way as by screws 159. On the top rim of tube 149 rests a right angled prism 160 which is fitted between the extension 150 and the inner wall 161 of lug 151. The prism 160 is clamped in place by a pair of small plates 162 and 163 (see Figs. 5 and 6) which are secured to their respective walls 150 and 161 by screws 164.

Figure 6:
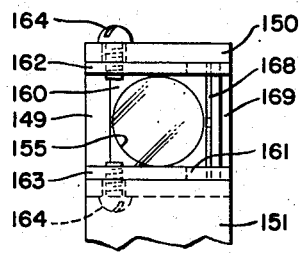
Fig. 6 illustrates the same detail in plan.
Figure 5:
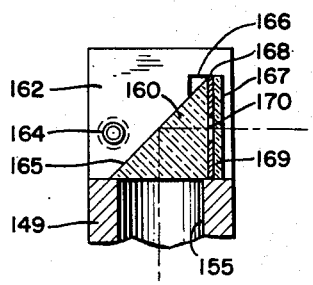
Fig. 5 shows an enlarged sectional view of a detail of the scanning mechanism.

The plates 162 and 163 are alike and each is cut away to provide a sloping edge 165 and a rectangular slot 166 which has a rear vertical edge 167. Immediately behind the prism 160 is a metal plate 168 and back of that is a glass plate 169. When the metal plates 162 and 163 are in position, as shown in Figs. 5 and 6, the sloping edges 165 bear down on the two side edges of the sloping face of prism 160. As a result the prism is forced downward and rearward so that the glass plate 169 is pushed against the vertical edge 167 of slot 166. Therefore, the parts 160, 168 and 169 are secured as a unit to the top of tube 149.

Figure 5A:
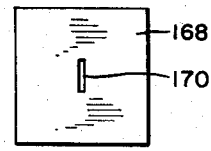
Fig. 5A is a magnified face view of the apertured plate in the optical scanning path.

The metal plate 168 has a minute rectangular slot 170 (magnified in Fig. 5A) which determines the effective scanning area of the illuminated tape surface, as will presently be explained more fully. By enclosing the plate 168 between two glass surfaces, the aperture 170 is completely protected from dust. This feature is of practical importance because the aperture 170 is so small (in the present machine it is 0.0045 inch wide and 0.024 inch long) that even particles of dust adhering to the edge would appreciably interfere with the passage of light therethrough. The pickup lens assembly 148 throws a sharp enlarged image of the illuminated area of the tape onto the apertured plate 168. The use of the right angled prism 160 gives a double advantage: it produces a more compact unit and also allows the operator to view the image on plate 168 through a front opening 171 in the hood or cover 104 of the scanning head. This is clear from Fig. 4. The cover 104 is preferably made of sheet metal painted flat black on the inside.

The light that passes through the aperture 170 of plate 168 strikes the sensitive electrode of a photocell 173 contained in a metal housing 174 which acts as an optical and electrical shield. The photocell 173 is preferably of the gas type because the sensitivity is much greater than for a vacuum type. A hole 175 in the front wall of the housing 174 (Fig. 4) allows the passage of light from the pickup lens assembly to the electrode of the cell. The housing 174 is cut away at the back to form an outer recess 176 (Figs. 2 and 4), but the right wall of the housing is entire to provide a rectangular panel 177 for receiving screws 178 which secure the housing to the plate 129 of bracket 127. In Fig. 3A, the holes 179 in bracket plate 129 receive the screws 178. To permit vertical adjustment of the housing the screws 178 pass through vertical slots 180 in panel 177, as shown in Fig. 4.

The pickup lens assembly 148 is adjustable as a unit up and down to focus the image of the tape on the plate 168. Referring to Fig. 1, there are two vertical rods 181 and 182 mounted in a thick bracket plate 183 secured to base 100. The rod 181 is screwed into the bracket plate 183 and remains fixed to act as a guide rod. The other rod 182, which has a screw driver slot on top for adjustment, passes rotatably through the lugs 151 and 152 of the pickup tube 149 and through lugs 184 and 185 of bracket plate 183. The rod 182 has a screw threaded section 186 between the supporting lugs 184 and 185, and this part of the rod has a screw connection with the lug 152 of pickup tube 149. The upper section of rod 182 is of slightly greater diameter than the rest of it to provide a shoulder 187 which rests on top of lug 184. The downward pressure of a coil spring 188 mounted on rod 182 between the fixed lug 184 and the movable lug 152 holds the shoulder 187 permanently against the lug 184.

As shown in Fig. 3, the fixed rod 181 passes between the extension 153 of the pickup tube casting and a metal strip 189 which is secured to the casting by a screw 190. Another screw 191 can be made tight or loose to clamp the pickup tube casting against the guide rod 181 or to release it for vertical adjustment. When the operator wants to adjust the pickup tube 194, he first loosens the screw 191, then turns the screw rod 182 to move the lens assembly up or down while he is watching the image on plate 168 through the peep hole 171. When the image is sharply focused, he tightens the clamping screw 191 and the lens assembly remains in adjusted position. The hood or cover 104 of the scanning head has a hole 104' (Fig. 2) for the insertion of a screw driver to turn the focusing rod 182.

The passage of light from the pickup lens assembly 148 to the photocell 173 is interrupted by a chopper disk 192 driven by a motor 193 which may be an A. C. induction motor. The disk has a hub 194 which is suitably fastened to the end of the motor shaft 195, as by a set screw 196. The motor 193 is mounted on bracket plate 128 by a pair of screws 197. The upper screw is shown in Fig. 3 and the lower one in Fig. 7. These two screws pass through horizontal slots 198 in bracket plate 128 so that the motor and chopper disk can be adjusted laterally of the pickup tube 148 to center the peripheral slots 199 of the disk with respect to the beam of light passing to the photocell 173. As is well known, the purpose of a chopper disk in optical scanners is to generate a signal carrier of a predetermined frequency depending upon the speed of the disk and the number of slots or teeth it has.

In the present case the scanning head is releasably locked on the supporting uprights 102 by a pair of lateral bolts 208 and 209 slidably mounted on base plate 100. An expanding coil spring 212 normally holds the outer ends of the bolts 208—209 in holes or recesses 214 in the uprights 102. These locking bolts are released by a rotary cam disk 218 carried on the lower end of a vertical shaft 219 which is supported by a U-shaped bracket 220. When the cam disk 218 is given a 90° turn by means of a knob 224 on the top of casing 104, the bolts 208—209 are simultaneously withdrawn from the supporting uprights 102 and the scanning head can be moved as a unit. We do not claim this feature as part of our invention because it belongs in the aforesaid pending application of Wise et al., Serial No. 624,786 now U. S. Patent 2,592,779.

Figure 8:
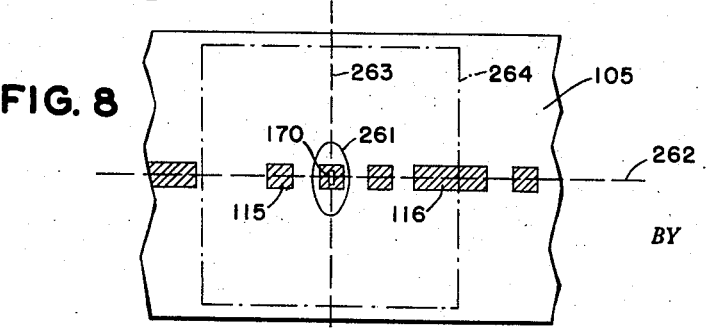
Fig. 8 is an enlarged diagrammatic illustration indicating roughly the operative relation between the printed code marks on the tape and the scanning aperture of the mechanism.

As previously described, the projection lens assembly 142 throws a constant spot of intense light on the tape as it runs over the guide roller 106. In Fig. 8, which is greatly exaggerated, this spot of scanning light is represented by the elliptical outline 261. The dotted horizontal line 262 indicates the scanning axis along the center of tape 105, and the dotted vertical line 263 represents the optical axis or center of the projection and pickup lens assemblies. If we imagine the scanning aperture 170 in plate 168 projected on the tape, it would appear as a small rectangle at the intersection of the axes 262 and 263. The dotted outline 264 represents the image of the illuminated tape area on plate 168. The area surrounding the bright scanning spot 261 will be less brightly illuminated but sufficiently so as to enable the operator to see the image for sharp focusing.

The relative dimensions of the different parts in Fig. 8 are not shown with mathematical accuracy but merely by way of approximation for clearness. Perhaps it will help to understand Fig. 8 better if we give some actual figures by way of example. In the transmitter which we have described we used a white paper tape three-eighths of an inch wide with black code marks printed thereon in the form of dots 115 and dashes 116. Each dot was 0.03 inch square and each dash measured 0.03 by 0.09 inch. The space between two successive marks was 0.03 inch.

The dimensions of the scanning aperture 170 on plate 168 we have already given and may be repeated here for convenience, namely, 0.0045 inch wide and 0.024 inch long. However, since the pickup lens assembly magnifies the image of the tape on plate 168, the dimensions of aperture 170 if projected on the tape, as assumed in Fig. 8, would be about 0.003 inch wide and 0.016 inch long. In other words, the effective scanning area 170 has only one-tenth the width of a code dot and is considerably shorter than the thickness of the code marks as measured transversely of the tape. The effect of the small scanning area 170 in relation to the area of the code marks is to send light impulses to the photocell 173 in the form of a wave with a steep front, as will be clear without further explanation.

In a preferred embodiment of our invention we find it desirable to provide the transmitter with certain safety devices when the tape runs out. Various forms of safety attachments automatically operated under those abnormal conditions are shown diagrammatically in Figs. 9 to 12 which we shall now describe.

Figure 9:
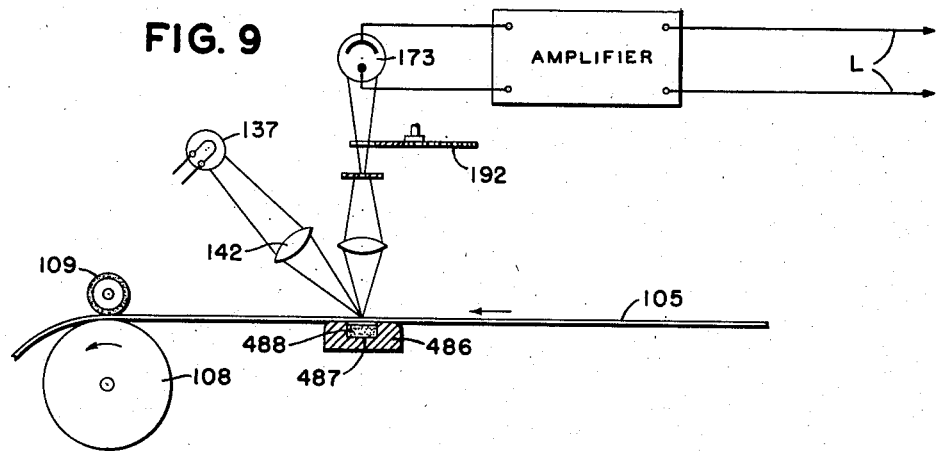
Figs. 9 to 12 show various arrangements for automatically sending standby signals over the line when the tape runs out.

Fig. 9 shows provisions for sending a white or background signal tone to the photocell 173 when the tape becomes exhausted. In this case the tape guide for the scanning mechanism consists of a block or platen 486 which may be adjustably supported like the guide roller 106 in Fig. 4. The platen 486 has a recess 487 which is filled with a light reflecting and diffusing material 488, like plaster of Paris. The surface of this material is set slightly below the tape level so that it will not become polished like a mirror which would reflect the light at an angle away from the photocell.

When the tape runs out, the projection lens 142 throws a spot of light on element 488 which acts like the white background of the tape so that a signal tone of maximum intensity is impressed on photocell 173. This signal tone is amplified and sent over the line L to a radio transmitter or other receiving apparatus as a white standby signal. When the operator at the facsimile receiving station gets this signal, he knows that the distant code tape transmitter has temporarily run out of tape and he stands by for the next message.

Figure 10:
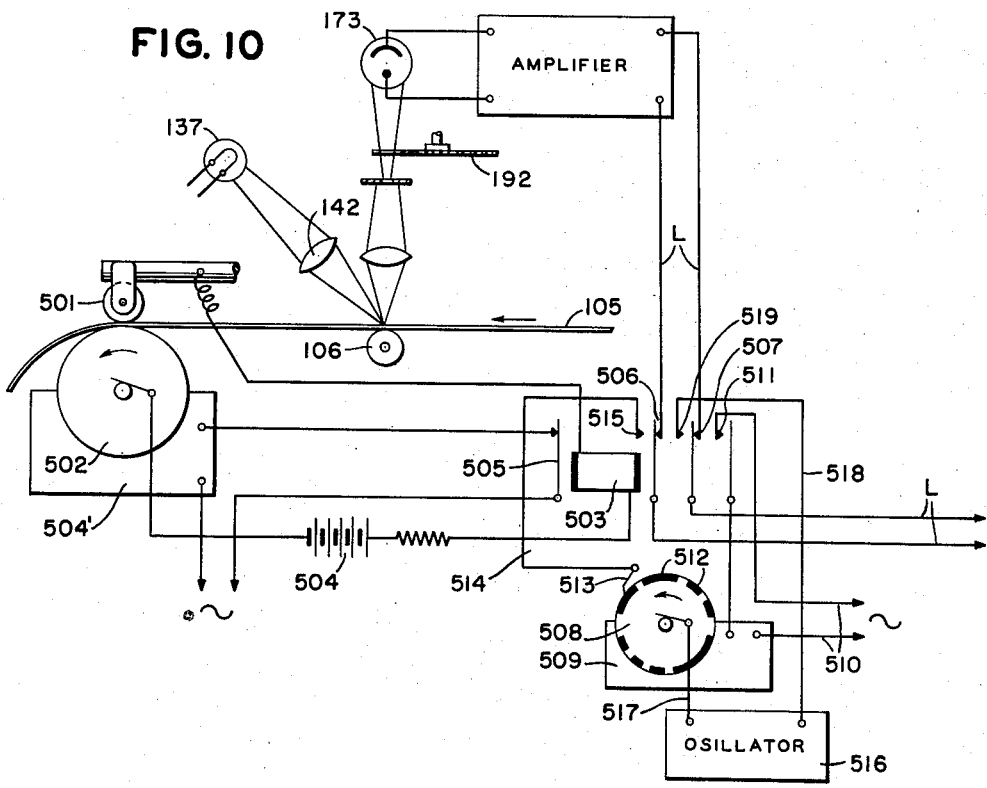

Fig. 10 shows an arrangement for automatically sending a coded standby signal or station call letters over the line when the tape runs out. In this case the pressure roller 501 and the tape driving pulley 502 form switch contacts in the circuit of a relay 503 which is energized by a battery 504 or other suitable source of power. The tape feed pulley 502 is operated by a motor 504' which includes in its circuit a normally closed switch 505 controlled by the relay 503. The transmission line L includes a pair of normally closed switches 506 and 507 which are opened when the relay 503 is energized.

A commutator 508 is driven at a certain speed by a motor 509 which is energized through a circuit 510 connected to a suitable source of power. The motor circuit 510 is closed through a switch 511 which is normally open and is closed only when the relay 503 is energized. The commutator 508 is a metal disk provided on its periphery with insulating segments 512 arranged to form a code signal or station call letters. A brush or contact finger 513 engages the commutator periphery and this brush is connected by a line 514 to a normally open contact 515 adapted to be closed when the relay 503 is energized. An oscillator 516 has an input circuit connected by a line 517 to the commutator 508 and by a line 518 to a switch contact 519 which is normally open and is closed by the energized relay 503.

As long as there is tape in the machine, the metallic members 501 and 502 are separated by the insulating paper tape and the circuit of relay 503 remains open. The circuit of motor 504' therefore remains closed and the tape is fed through the machine at prescribed speed, as previously explained. However, when the tape becomes exhausted, the conducting members 501 and 502 directly engage and close the circuit of relay 503 which is instantly energized to accomplish the following results: The switch 505 is opened and the feed tape motor 504' stops; the switch 511 is closed and the motor 509 is energized to operate the signal commutator 508; the switches 506 and 507 are opened and the associated contacts 515 and 519 are closed to switch the output of the amplifier through the commutator 508 to the oscillator 516. The coded commutator 508 causes the oscillator 516 to send a standby signal over the line L to the distant receiver until fresh tape is inserted in the transmitter.

Figure 11:
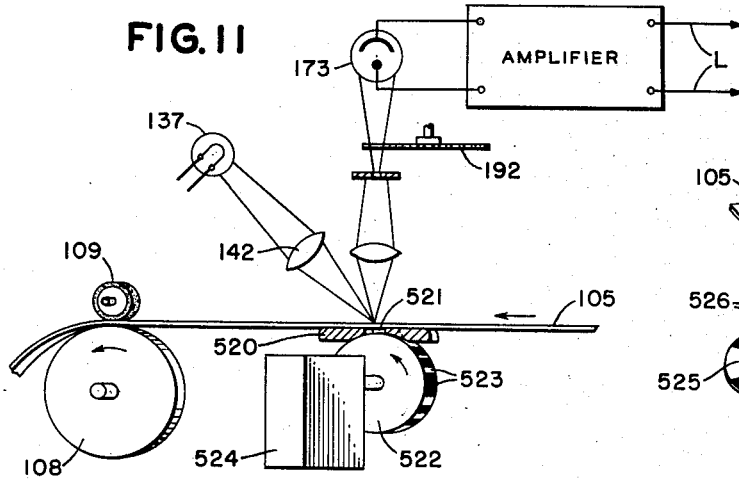

Another and simpler method of sending out a coded standby signal is disclosed in Fig. 11 where the scanning light itself is used to generate the signal. Here the coded tape 105 runs over a thin plate 520 which has an aperture 521 in line with the scanning beam. Beneath the plate 520 is a thick disk or short cylinder 522 with black and white marks 523 on its periphery. These marks represent a prearranged code. A small motor 524 running constantly drives the code disk 522 at a definite speed. When the tape is exhausted, the scanning spot strikes the periphery of the rotating disk 522 with the result that the photocell 173 receives the signal represented by the marks 523. This signal goes out from the amplifier over the transmission line L until the next tape is inserted or until the machine is shut down.

Figure 12:
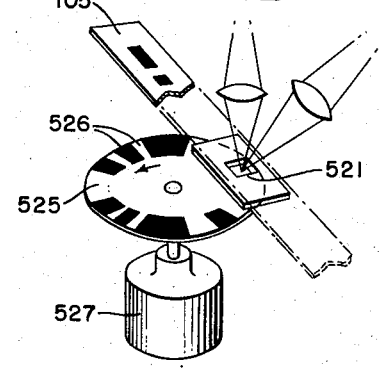

Instead of using a disk with code marks on its periphery as in Fig. 11, we may employ a thin disk 525 with code marks 526 arranged on its face around the edge, as shown in Fig. 12. A motor 527 constantly rotates the disk 525 which is so mounted that the code marks 526 come under the aperture 521 into the path of the scanning beam. Otherwise what has been said for Fig. 11 applies to Fig. 12.

It will be apparent that the various features of novelty contained in our invention need not all be embodied in the same installation, for certain features retain their inherent advantages independently of others. Wherever we have given exact figures, such as to designate dimensions, these are intended merely for purposes of explanation. Also, when we refer to the code marks as black and to the background of the tape as white, we use the terms black and white in a broad sense to include any dark or light colors of such contrast as to reflect a minimum and a maximum amount of light to the photocell during the scanning operation.

It is hardly necessary to add that the specific apparatus and circuits which we have described represent but one form of our invention and are not to be taken as a restriction or limitation thereof. Modifications and variations may occur to those skilled in the art without departing from the nature and scope of our invention as defined in the appended claims.

We claim as our invention:

1. In a telegraph transmitter, optical scanning mechanism having an apertured plate in the path of the scanning beam, and a pair of transparent members in close physical contact with the opposite sides of said plate and extending across the aperture of said plate for shielding the same.

2. In a code tape transmitter, optical scanning mechanism for energizing a photocell by light reflected from a coded tape, said mechanism having a lens system disposed between said photocell and said tape, a plate with an aperture in the optical path between the lens system and said photocell, and adjustable means for focusing the scanned image of the tape on said plate, whereby said aperture determines the scanning area of the tape.

3. In a code tape transmitter, optical scanning mechanism for energizing a photocell by light reflected from a coded tape, said mechanism having a prism and an apertured plate arranged in the optical path between the tape and said photocell, said prism reflecting the light through the aperture of said plate to the photocell, and means for adjusting said prism and plate as a unit to focus the scanned image of the tape on said plate, whereby said aperture determines the scanning area of the tape, said image being viewable through the prism.

4. A code tape transmitter having means for scanning a coded tape and generating signal impulses, means for driving the tape during the scanning operation, a transmission line for said impulses, a rotary member provided with code areas, said member being normally inoperative in relation to said transmission line, and means for automatically causing said coded member to send a standby signal to the line when the tape runs out.

5. A code tape transmitter having optical means for scanning a coded tape and generating signal impulses, means for driving the tape during the scanning operation, a transmission line for said impulses, and a rotary member provided with code marks which are shielded from the scanning beam by the tape, whereby said code marks are automatically scanned when the tape runs out to send a standby signal to the line.

6. A code tape transmitter having means for scanning a coded tape and generating signal impulses, means for driving the tape during the scanning operation, a transmission line for said impulses, a normally inoperative rotary member provided with code marks, a normally inoperative signal generator coupled to said rotary member and associated with said line, and means for automatically energizing said generator and said rotary member to send a standby signal to the line when the tape runs out and disengages said driving means.

7. A code tape transmitter having means for scanning a coded tape and generating signal impulses, means for driving the tape during the scanning operation, an amplifier for the signal impulses, a normally inoperative rotary member provided with code marks, a transmission line for the amplified impulses, a normally inoperative signal generator coupled to said rotary member and associated with said line, and means for energizing said generator and said rotary member and switching the line from the output of the amplifier to the signal generator when the tape runs out and disengages said driving means, whereby said generator sends a standby signal to the line.

8. A code tape transmitter having means for scanning a coded tape and generating signal impulses, a transmission line for said impulses, a pair of metal rollers for driving the tape during the scanning operation, the tape passing between said rollers and holding them apart, an electric motor for driving said rollers, a relay energized when the tape runs out and said rollers engage each other, a switch opened by said energized relay for breaking the motor circuit, and means controlled by the energized relay for sending a standby signal to the line, said means comprising a normally inoperative rotary member provided with code areas.

9. In a code tape transmitter connected to a transmission line and having optical scanning mechanism for tape with code marks disposed on a contrasting background, said mechanism including a light source and a photocell for receiving light from said light source reflected from the scanned tape, means for moving said tape in the path of said light source, a member having a surface normally shielded from the path of said light by said tape and disposed in part in the path of said light when the tape runs out, a predetermined area of said surface having light reflecting characteristics corresponding substantially to that of the background of the tape and means for sending signals to the line in accordance with the light reflected by said area when said tape runs out.

10. In a code tape transmitter having optical scanning mechanism for tape with code marks disposed on a contrasting background, said mechanism including a light source and a photocell for receiving light from said light source reflected from the scanned tape, means for moving said tape in the path of said light source, a member having a surface normally shielded from the path of said light by said tape and disposed in part in the path of said light when the tape runs out, a predetermined area of said surface having light reflecting characteristics corresponding substantially to that of the background of the tape, said surface having another area having light reflecting characteristics corresponding substantially to that of the code marks on said tape, means for moving said surface to bring said latter area into said light path and means for sending signals in accordance with the light reflected by said areas.

11. In a code tape transmitter having optical scanning mechanism for tape with code marks disposed on a contrasting background, said mechanism including a light source and a photocell for receiving light from said light source reflected from the scanned tape, means for moving said tape in the path of said light source, a member having a surface normally shielded from the path of said light by said tape and disposed in part in the path of said light when the tape runs out, alternate areas of said surface having light reflecting characteristics corresponding respectively to said tape code marks and said tape background, means for moving said surface to bring said areas into the path of said light sequentially and means for sending signals in accordance with the light reflected by said areas.

RALEIGH J. WISE.
GARVICE H. RIDINGS.

References Cited in the file of this patent

UNITED STATES PATENTS

| Number | Name | Date |
|---|---|---|
| 1,763,357 | Jenkins | June 10, 1930 |
| 1,982,133 | Canady | Nov. 27, 1934 |
| 2,177,077 | Potts | Oct. 24, 1939 |
| 2,213,664 | Berg | Sept. 3, 1940 |
| 2,234,832 | Potts | Mar. 11, 1941 |
| 2,307,099 | Apperley | Jan. 5, 1943 |
| 2,351,229 | Potts | June 13, 1944 |
| 2,451,045 | Potts | Oct. 12, 1948 |